United States Patent
Ha et al.

(10) Patent No.: US 12,276,791 B2
(45) Date of Patent: Apr. 15, 2025

(54) OPTICAL APPARATUS FOR AUGMENTED REALITY WITH VISION CORRECTION FUNCTION

(71) Applicant: LETINAR CO., LTD, Anyang-si (KR)

(72) Inventors: Jeong Hun Ha, Seoul (KR); Soon Gi Park, Seoul (KR)

(73) Assignee: LETINAR CO., LTD, Anyang-si (KR)

(*) Notice: Subject to any disclaimer, the term of this patent is extended or adjusted under 35 U.S.C. 154(b) by 555 days.

(21) Appl. No.: 17/635,262

(22) PCT Filed: Aug. 19, 2020

(86) PCT No.: PCT/KR2020/011026
§ 371 (c)(1),
(2) Date: Feb. 14, 2022

(87) PCT Pub. No.: WO2021/034096
PCT Pub. Date: Feb. 25, 2021

(65) Prior Publication Data
US 2022/0291508 A1    Sep. 15, 2022

(30) Foreign Application Priority Data
Aug. 21, 2019    (KR) .......... 10-2019-0102122

(51) Int. Cl.
G02B 27/01    (2006.01)
G02B 27/30    (2006.01)

(52) U.S. Cl.
CPC .. *G02B 27/0172* (2013.01); *G02B 2027/0174* (2013.01); *G02B 2027/0178* (2013.01); *G02B 27/30* (2013.01)

(58) Field of Classification Search
CPC ............... G02B 27/0172; G02B 27/30; G02B 2027/0174; G02B 2027/0178; G02B 27/4205; G02C 7/086
(Continued)

(56) References Cited

U.S. PATENT DOCUMENTS 9,632,312 B1*  4/2017  Cakmakci .......... G02B 27/0172
12,013,556 B2*  6/2024  Ha ........................ G02B 5/10
(Continued)

FOREIGN PATENT DOCUMENTS

CN    206178247 U  *  5/2017
CN    108474947 A     8/2018
(Continued)

*Primary Examiner* — Stephone B Allen
*Assistant Examiner* — Boutsikaris Leonidas
(74) *Attorney, Agent, or Firm* — Rabin & Berdo, P.C.

(57) ABSTRACT

The present invention is directed to an optical apparatus for augmented reality with a vision correction function. The optical apparatus for augmented reality with a vision correction function includes: an image output unit configured to output augmented reality image light; a reflective unit configured to transfer the augmented reality image light to the pupil of a user's eye; and an optical means configured such that the reflective unit is disposed therein, and configured to transmit therethrough at least part of real object image light toward the pupil of the user's eye; wherein the optical means includes a first surface and a second surface; wherein the reflective unit is disposed inside between the first and second surfaces of the optical means; and wherein at least any one of the first and second surfaces of the optical means is formed as a curved surface.

17 Claims, 10 Drawing Sheets

HOLOGRAPHIC FILM

(58) Field of Classification Search
USPC .......................................................... 351/158
See application file for complete search history.

(56) References Cited

U.S. PATENT DOCUMENTS

| | | | |
|---|---|---|---|
| 2016/0131907 A1 | 5/2016 | Martinez et al. | |
| 2018/0059414 A1* | 3/2018 | Campbell | ............... G02F 1/157 |
| 2019/0072767 A1* | 3/2019 | Vallius | .................. H04N 9/646 |
| 2019/0353897 A1* | 11/2019 | Suzuki | ............... G02B 27/0081 |

FOREIGN PATENT DOCUMENTS

| | | | | |
|---|---|---|---|---|
| JP | 2000-511306 A | | 8/2000 | |
| JP | 2015219489 A | * | 12/2015 | ......... G02B 27/0172 |
| JP | 2018-116219 A | | 7/2018 | |
| KR | 10-2013-0126623 A | | 11/2013 | |
| KR | 1020150018879 A | | 2/2015 | |
| KR | 10-2016-0091402 A | | 8/2016 | |
| KR | 20160091402 A | * | 8/2016 | |
| KR | 10-1660519 B1 | | 9/2016 | |
| KR | 10-2018-0028339 A | | 3/2018 | |
| KR | 10-2019-0063442 A | | 6/2019 | |
| WO | 2017176943 A1 | | 10/2017 | |

\* cited by examiner

HOLOGRAPHIC FILM

LENS CLIP FOR FOCUS CORRECTION (a)　　　　　　　　　　　(b)

OPTICAL APPARATUS FOR AUGMENTED REALITY WITH VISION CORRECTION FUNCTION

TECHNICAL FIELD

The present invention relates to an optical apparatus for augmented reality, and more particularly to an optical apparatus for augmented reality that can provide a vision correction function to a user having refractive error such as nearsightedness or farsightedness.

BACKGROUND ART

Augmented Reality (AR) refers to technology that superimposes a virtual image, generated by a computer or the like, on a real image of the real world and then provides a resulting image, as is well known.

In order to implement such augmented reality, there is required an optical system that allows a virtual image, generated by a device such as a computer, to be superimposed on an image of the real world and also allows a resulting image to be provided. As such an optical system, there is known a technology using an optical means, such as a prism, that reflects or refracts a virtual image by using a head-mounted display (HMD) or a glasses-type device.

Refractive error (ametropia) such as nearsightedness or farsightedness is a considerably common problem experienced by more than 50% of Koreans. A user having refractive error needs to wear a vision correction device such as glasses. Accordingly, there is a problem in that in order to observe an augmented reality image for the user having refractive error, a separate device for providing augmented reality needs to be worn in addition to a vision correction device.

In a conventional augmented reality device, a method of attaching holographic film, serving as a mirror, to a vision correction lens and using them as an optical combiner has been proposed in order to solve the above problem.

FIG. 1 shows an augmented reality device implemented in the form of glasses and a holographic film attached to the lens of the augmented reality device and used as an optical combiner.

This method has a problem in that the conditions such as field of view, an eyebox and etc. for augmented reality image (virtual image) are severely limited because the holographic film has a narrow area. Furthermore, there is a problem in that image quality, resolution, and ability of color expression are remarkably limited due to the limitation of a display (e.g., laser projection) that can be used. Furthermore, since vision correction is performed using a single curved surface, there is also a limitation in which a vision correction range is limited to the range of −4D to +2D.

Meanwhile, there is also known a method of mounting a separate lens clip on a glasses-type augmented reality device.

FIG. 2 shows a state in which a separate lens for focus correction is mounted in the form of a clip on a glasses-type augmented reality device.

This method uses the lens for focus correction mounted on the glasses-type augmented reality device by a magnetic clip. However, this method has a disadvantage in that the volume and weight of the resulting apparatus increase because the lens for focus correction needs to be installed additionally on the glasses-type augmented reality device. Furthermore, since the lens clip needs to be always worn only inside of glasses (the direction toward a user) in order to perform vision correction for both virtual image and real image, there is a limitation in terms of design.

Therefore, there is a demand for the development of a technology that provides a vision correction function in a convenient and efficient manner in an augmented reality optical device.

PRIOR ART DOCUMENT

Korean Patent No. 10-1660519 (published on Sep. 29, 2016)

DISCLOSURE

Technical Problem

The present invention has been conceived to overcome the above-described problems, and an object of the present invention is to provide an optical apparatus for augmented reality that can provide a vision correction function to a user having refractive error such as nearsightedness or farsightedness.

Furthermore, another object of the present invention is to provide an optical apparatus for augmented reality that allows a combination of at least one of a method for the curved design of an optical means, a method for the curved design of a reflective unit, and a method using an auxiliary optical element to be used, so that a vision correction function can be efficiently provided for a user having refractive error, a small volume and a light weight can be achieved, and the degree of freedom can be increased in terms of design.

Technical Solution

In order to accomplish the above objects, the present invention provides an optical apparatus for augmented reality with a vision correction function, the optical apparatus including: an image output unit configured to output augmented reality image light, which is image light corresponding to an image for augmented reality; a reflective unit configured to transfer the augmented reality image light, output from the image output unit, to the pupil of a user's eye by reflecting the augmented reality image light toward the pupil, thereby providing an image for augmented reality to the user; and an optical means configured such that the reflective unit is disposed therein, and configured to transmit therethrough at least part of real object image light, which is image light output from a real object, toward the pupil of the user's eye; wherein the optical means includes a first surface through which at least part of the augmented reality image light reflected by the reflective unit and the real object image light is output toward the user's pupil, and a second surface which is opposite to the first surface and onto which the real object image light is incident; wherein the reflective unit is disposed inside between the first and second surfaces of the optical means; and wherein at least any one of the first and second surfaces of the optical means is formed as a curved surface.

In this case, the curved surface is preferably a concave surface or a convex surface.

Furthermore, the surface other than the surface formed as the curved surface may be formed as any one of a flat surface, a concave surface, and a convex surface.

Furthermore, the first surface may be formed as a concave surface, the second surface may be formed as a convex surface, and the curvature of the first surface may be larger than that of the second surface.

Furthermore, the first surface may be formed as a concave surface, the second surface may be formed as a convex surface, and the curvature of the second surface may be larger than that of the first surface.

Furthermore, the augmented reality image light output from the image output unit may be transferred to the reflective unit after being reflected by total internal reflection on at least one of the first and second surfaces of the optical means at least once, and at least one of the first and second surfaces of the optical means may have a total internal reflection area formed as a flat surface configured to reflect the augmented reality image light, output from the image output unit, by total internal reflection.

Furthermore, the reflective unit may be formed as a curved surface.

Furthermore, the augmented reality image light output from the image output unit may be transferred to the reflective unit via an auxiliary optical element.

According to another aspect of the present invention, there is provided an optical apparatus for augmented reality with a vision correction function, the optical apparatus including: an image output unit configured to output augmented reality image light, which is image light corresponding to an image for augmented reality; a reflective unit configured to transfer the augmented reality image light, output from the image output unit, to the pupil of a user's eye by reflecting the augmented reality image light toward the pupil, thereby providing an image for augmented reality to the user; and an optical means configured such that the reflective unit is disposed therein, and configured to transmit therethrough at least part of real object image light, which is image light output from a real object, toward the pupil of the user's eye; wherein a surface of the reflective unit is formed as a curved surface.

In this case, the surface of the reflective unit may be a concave surface or a convex surface.

Furthermore, the reflective unit may be formed as a plurality of reflective units; and the plurality of reflective units may include at least some of a plurality of unit reflective means obtained by dividing one reflective means having a surface formed as a curved surface.

Furthermore, the plurality of reflective units may be formed by dividing the one reflective means into the plurality of unit reflective means in the state of placing the one reflective means in a forward direction from the pupil and disposing unit reflective means, to be used as the reflective units, between the first and second surfaces of the optical means by moving the unit reflective means to be used as the reflective units without a change to their shapes in directions parallel to the forward direction from the pupil.

The optical means may include a first surface through which at least part of the augmented reality image light reflected by the reflective unit and the real object image light is output toward the user's pupil, and a second surface which is opposite to the first surface and onto which the real object image light is incident; the reflective unit may be disposed inside between the first and second surfaces of the optical means; and at least any one of the first and second surfaces of the optical means may be formed as a curved surface.

Furthermore, the augmented reality image light output from the image output unit may be transferred to the reflective unit via an auxiliary optical element.

According to another aspect of the present invention, there is provided an optical apparatus for augmented reality with a vision correction function, the optical apparatus including: an image output unit configured to output augmented reality image light, which is image light corresponding to an image for augmented reality; a reflective unit configured to transfer the augmented reality image light, output from the image output unit, to the pupil of a user's eye by reflecting the augmented reality image light toward the pupil, thereby providing an image for augmented reality to the user; and an optical means configured such that the reflective unit is disposed therein, and configured to transmit therethrough at least part of real object image light, which is image light output from a real object, toward the pupil of the user's eye; wherein the augmented reality image light output from the image output unit is transferred to the reflective unit via an auxiliary optical element.

In this case, the auxiliary optical element may be at least one of a refractive means, a diffractive means, and a holographic element.

Furthermore, the refractive means may be a concave lens or a convex lens.

Furthermore, the image output unit may include a display device configured to output augmented reality image light through a screen by displaying an image for augmented reality on the screen, and a collimator configured to output the collimated light of the augmented reality image light output from the display device; and an optical path along which the augmented reality image light is transferred to the optical means is changed by varying the focal length of the collimator or varying the interval between the display device and the collimator.

Furthermore, the optical means may include a first surface through which at least part of the augmented reality image light reflected by the reflective unit and the real object image light is output toward the user's pupil, and a second surface which is opposite to the first surface and onto which the real object image light is incident; the reflective unit may be disposed inside between the first and second surfaces of the optical means; and at least any one of the first and second surfaces of the optical means may be formed as a curved surface.

Furthermore, the reflective unit may be formed as a curved surface.

Advantageous Effects

According to the present invention, there is an effect of providing the optical apparatus for augmented reality that can provide a vision correction function to a user having refractive error such as nearsightedness or farsightedness.

Furthermore, the present invention may provide the optical apparatus for augmented reality that allows a combination of at least one of a method for the curved design of an optical means, a method for the curved design of a reflective unit, and a method using an auxiliary optical element to be used, so that a vision correction function can be efficiently provided for a user having refractive error, a small volume and a light weight can be achieved, and the degree of freedom can be increased in terms of design.

DESCRIPTION OF DRAWINGS

FIGS. 10 and 11 are diagrams illustrating an optical device (800) for augmented reality with a vision correction function according to still another embodiment of the present invention, wherein FIG. 10 is a side view showing the overall configuration of the optical device (800) for augmented reality and FIG. 11 is a view illustrating the configuration of reflective units (21A and 21B);

FIGS. 12 and 13 are diagrams illustrating an optical device (900) for augmented reality with a vision correction function according to still another embodiment of the present invention, wherein FIG. 12 is a side view showing the overall configuration of the optical device (900) for augmented reality and FIG. 13 is a view illustrating the configuration of reflective units (22A and 22B);

BEST MODE

Embodiments according to the present invention will be described in detail below with reference to the accompanying drawings.

First, the basic principle of the present invention will be briefly described with reference to the prior art document.

The technology described in the prior art document intends to solve the problems of an augmented reality implementation apparatus using the conventional optical system, i.e., the problems in which it is inconvenient for a user to wear the apparatus because the configuration thereof is complicated and thus the weight and volume thereof are considerable and in which the manufacturing cost thereof is high because the manufacturing process thereof is also complicated.

Furthermore, the conventional augmented reality implementation apparatus has a limitation in that a virtual image becomes out of focus when a user changes a focal length while gazing at the real world. In order to solve this problem, there has been proposed a technology using a component, such as a prism, capable of adjusting a focal length for a virtual image, electrically controlling a variable focus lens in response to a change in focal length, or the like. However, this technology also has a problem in that a user is required to perform a separate operation in order to adjust the focal length or there are required hardware such as a separate processor and software for controlling the focal length.

Accordingly, as described in the prior art document, the applicant of the present application proposed an augmented reality implementation apparatus that might project a virtual image onto the retina through the pupil by using a reflective unit having a smaller size than the human pupil, so that the volume and weight thereof might be significantly reduced, the manufacturing process thereof might be simplified, and a clear virtual image might always be provided regardless of whether a user changed the focal length.

Figure 1:
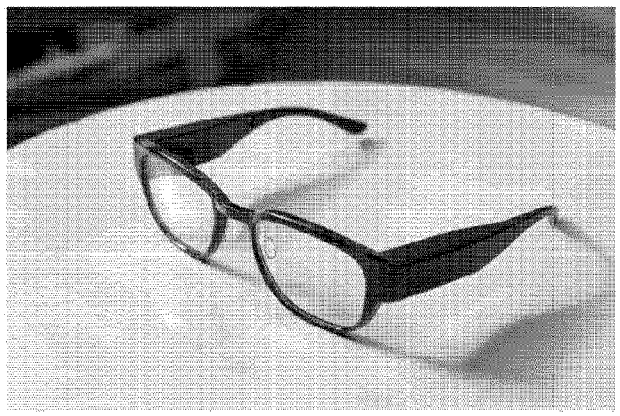
FIG. 1 shows an augmented reality device implemented in the form of glasses and a holographic film attached to the lens of the augmented reality device and used as an optical combiner.
Figure 1:
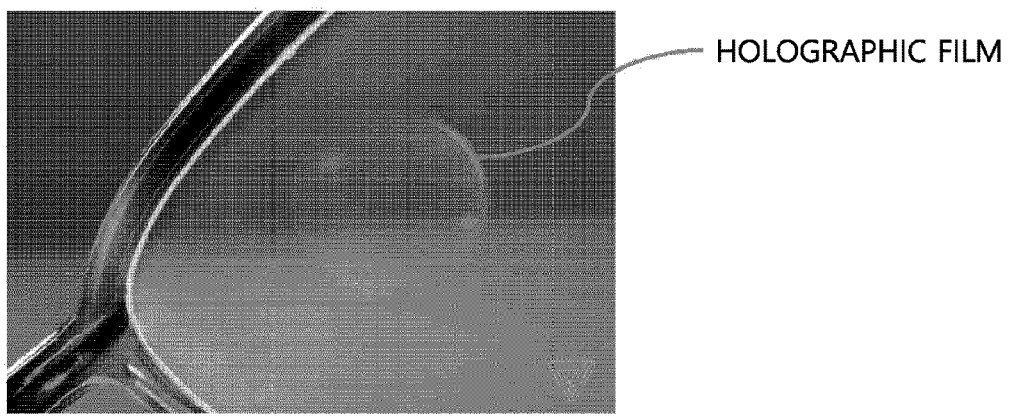
Figure 2:
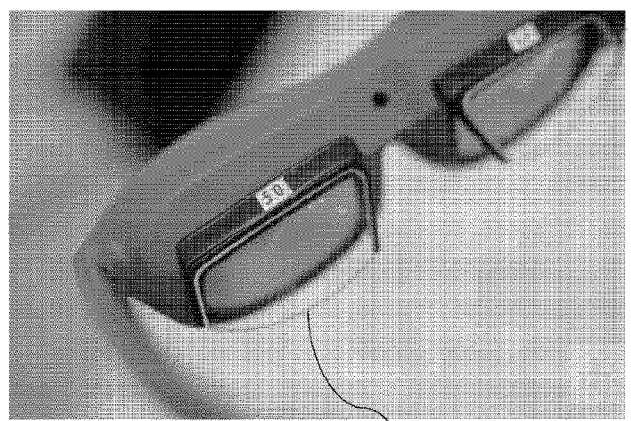
FIG. 2 shows a state in which a separate lens for focus correction is mounted in the form of a clip on a glasses-type augmented reality device.
Figure 3:
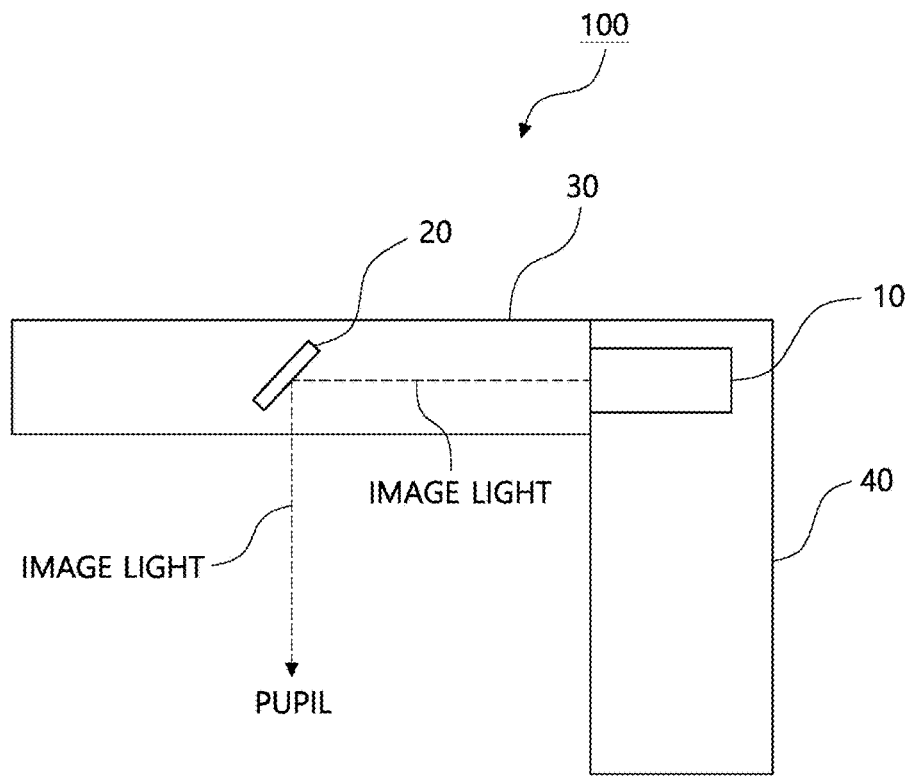
FIG. 3 is a diagram showing an optical apparatus (100) for augmented reality disclosed in the above-described the prior art document.

FIG. 3 is a diagram showing an optical apparatus 100 for augmented reality disclosed in the above-described prior art document.

The optical apparatus 100 for augmented reality shown in FIG. 3 includes an image output unit 10, a reflective unit 20, and an optical means 30.

The image output unit 10 is a means for outputting image light corresponding to an image for augmented reality, and may be implemented as, e.g., a small-sized display device.

The reflective unit 20 reflects image light corresponding to an image for augmented reality, output from the image output unit 10, toward a user's pupil, thereby providing the image for augmented reality. The reflective unit 20 is disposed inside the optical means 30 at an appropriate angle so that the reflective unit 20 can reflect image light corresponding to an image for augmented reality, output from the image output unit 10, to the pupil between the image output unit 10 and the pupil.

The optical means 30 is a means for transmitting therethrough at least part of the image light output from a real object. For example, the optical means 30 may be in the form of a glasses lens or a lens module that can be attached to glasses. The reflective unit 20 may be embedded inside the optical means 30. A frame unit 40 is a means for fixing and supporting the image output unit 10 and the optical means 30.

The reflective unit 20 of FIG. 3 is formed to have a smaller size than the human pupil, i.e., 8 mm or less. The depth of field for the light incident onto the pupil through the reflective unit 20 may be made close to infinity, i.e., considerably deep, by forming the reflective unit 20 to be smaller than the pupil size, as described above.

In this case, the depth of field refers to a range within which an image is recognized as being in focus. When the depth of field get increases, a focal length for an image for augmented reality increases accordingly.

Thus, even when a user changes the focal length for the real world while gazing at the real world, an image for augmented reality is always recognized as being in focus regardless of such a change of the focal length. This may be considered as a pinhole effect. Accordingly, the optical apparatus 100 for augmented reality shown in FIG. 3 may always provide a clear virtual image for an image for augmented reality even when a user changes the focal length while gazing at a real object in the real world.

The present invention is characterized by providing an optical apparatus for augmented reality with a vision correction function based on the technology described in the prior art document. The optical apparatus for augmented reality with a vision correction function according to the present invention will be described in detail with reference to FIG. 4 and the following drawings.

Figure 4:
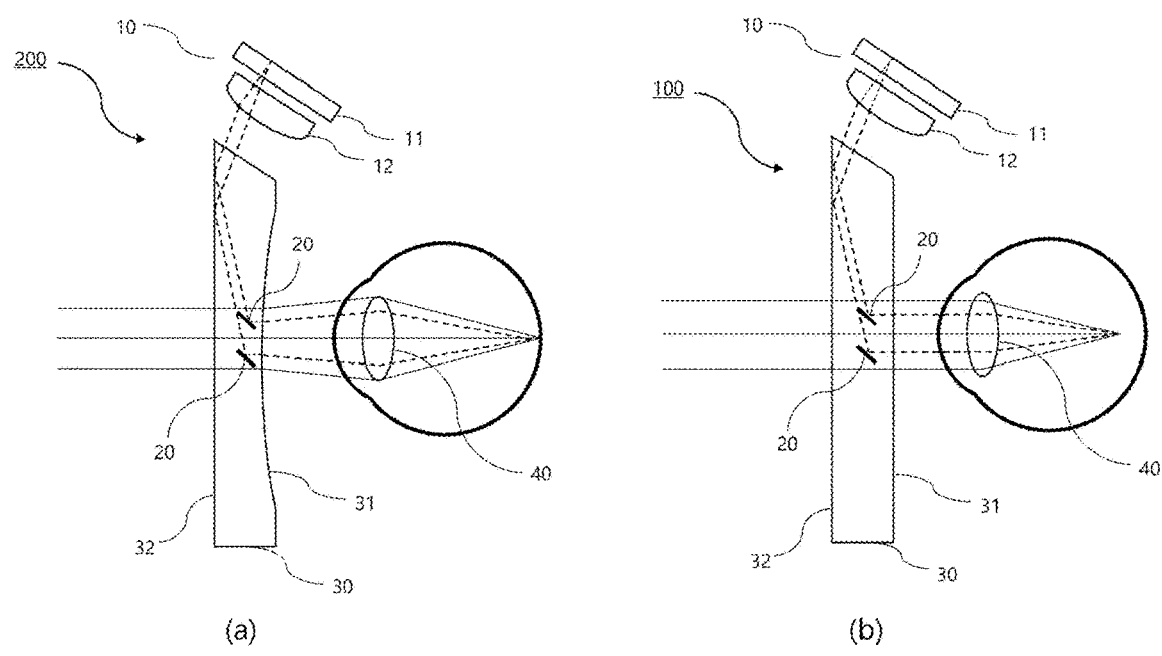
FIG. 4 is a diagram showing the overall configuration of an optical apparatus (200) for augmented reality with a vision correction function according to an embodiment of the present invention.

FIG. 4 is a diagram showing the overall configuration of an optical apparatus 200 for augmented reality with a vision correction function according to an embodiment of the present invention.

FIG. 4(a) shows a side view of the optical apparatus 200 for augmented reality with a vision correction function according to the embodiment of the present invention, and FIG. 4(b) shows a side view of the conventional optical apparatus 100 for augmented reality described in the prior art document for the purpose of comparison with the present embodiment.

As shown in FIG. 4, the optical apparatus 200 for augmented reality with a vision correction function (hereinafter referred to as the "optical apparatus 200 for augmented reality") according to the present embodiment includes an image output unit 10, a reflective unit 20, and an optical means 30.

The image output unit 10 is a means for outputting image light corresponding to image light for augmented reality.

The image output unit 10 is a means for outputting augmented reality image light, which is image light corresponding to an image for augmented reality, toward the optical means 30. For example, the image output unit 10 may include a display device 11, such as a small-sized LCD, configured to output augmented reality image light by displaying an image for augmented reality on a screen, and a collimator 12 configured to output the collimated light of the augmented reality image light output from the display device 11.

Although a case including the collimator 12 is illustrated as an example in FIG. 4, it is obvious that the collimator 12 is not essential and may be omitted. Alternatively, instead of the collimator 12, a reflective means, refractive means, or diffractive means for reflecting, refracting, or diffracting the augmented reality image light output from the display device 11 and transmitting it toward the optical means 30 may be used.

Since the image output unit 10 itself is not a direct target of the present invention and is known in the prior art, a detailed description thereof will be omitted.

Meanwhile, the image for augmented reality refers to a virtual image displayed on the screen of the display device 11 and transferred to the pupil 40 of the user via the image output unit 10, the reflective unit 20, and the optical means 30, and may be a still image or moving image.

Such an image for augmented reality is provided to the user as a virtual image by being output as image light from the display device 11 and then transferred to the pupil 40 of the user by the image output unit 10, the reflective unit 20, and the optical means 30. At the same time, the user directly gazes at real object image light, which is the image light output from a real object present in the real world via the optical means 10, with his/her eye via the optical means 30. As a result, the user is provided with an augmented reality service.

The reflective unit 20 is a means for providing an image for augmented reality to the user by transferring the augmented reality image light, output from the image output unit 10, to the pupil 40 of the user's eye by reflecting the augmented reality image light toward the pupil 40.

The reflective unit 20 is disposed inside the optical means 30 between the first and second surfaces 31 and 32 of the optical means 30.

Here, the first surface 31 is defined as the surface of the optical means 30 facing the user's pupil 40 when the user wears the optical apparatus 100 for augmented reality, and the second surface 32 is defined as the surface opposite to the first surface 31.

In other words, the optical means 30 includes the first surface 31 through which at least part of the augmented reality image light reflected by the reflective unit 20 and real object image light is output toward the user's pupil 40, and the second surface 32 which is opposite to the first surface 31 and onto which the real object image light is incident. The reflective unit 20 is disposed inside between the first and second surfaces 31 and 32 of the optical means 30.

Meanwhile, although the augmented reality image light output from the image output unit 10 is shown as being reflected by total internal reflection on the second surface 32 of the optical means 30 once and then transferred to the reflective unit 20 in FIG. 4, this is exemplary. It is obvious that a configuration may be made such that the augmented reality image light is reflected by the total internal reflection on the first surface 31 or second surface 32 of the optical means 30 twice or more and is then transferred to the reflective unit 20.

Alternatively, a configuration may be made such that the augmented reality image light output from the image output unit 10 is transferred directly to the reflective unit 20 without total inner reflection at the inner surface of the optical means 30.

The reflective unit 20 is disposed at an appropriate inclination angle with respect to the inner surface of the optical means 20 so that the reflective unit 20 10 can reflect and transfer the augmented reality image light, output from the image output unit, toward the pupil 40 of the user's eye.

When there is employed the configuration in which the augmented reality image light output from the image output unit 10 is reflected by total internal reflection on the second surface 32 of the optical means 30 once and transferred to the reflective unit 20, as shown in FIG. 4, the reflective unit 20 may be disposed at an appropriate inclination angle by taking into consideration the locations of the augmented reality image light incident onto the second surface 32 of the optical means 30 from the image output unit 10, the augmented reality image light reflected by total internal reflection on the second surface 32 and output to the reflective unit 20, and the pupil 40.

Meanwhile, as described above with reference to FIG. 3, the reflective unit 20 is preferably formed to have a smaller size than the human pupil, i.e., 8 mm or less, in order to provide a pinhole effect by increasing the depth of field.

In other words, the reflective unit 20 is formed in a size smaller than the size of the normal human pupil, i.e., 8 mm or less, more preferably 4 mm or less. Accordingly, the depth of field for light incident onto the pupil through the reflective unit 20 may be made close to infinity, i.e., considerably deep. Accordingly, there may be achieved the pinhole effect in which an image for augmented reality is always recognized as being in focus regardless of a change in the focal length for the real world even when a user changes the focal length for the real world while gazing at the real world.

Meanwhile, the reflective unit 20 may be formed as a plurality of reflective units. As shown in FIG. 4, each of the plurality of reflective units 20 is appropriately disposed in order not to block the augmented reality image light, reflected by total internal reflection on the second surface 32 of the optical means 30, from being transferred to the other reflective units 20. Even in this case, the size of each of the reflective units 20 is formed to be 8 mm or less, preferably 4 mm or less.

Meanwhile, the optical means 30 is a means in which the reflective units 20 are disposed and which transmits therethrough at least part of real object image light, which is the image light output from a real object, toward the pupil 40 of the user's eye.

In this case, transmitting at least part of real object image light toward the pupil 40 signifies that the light transmittance of the real object image light does not necessarily have to be 100%.

Furthermore, when there is employed the configuration in which the augmented reality image light output from the image output unit 10 is reflected by total internal reflection, as shown in FIG. 4, the optical means 30 reflects the augmented reality image light, output from the image output unit 10, on the first surface 31 or second surface 32 thereof at least once and transfers the augmented reality image light to the reflective units 20.

As described above, the optical means 10 includes the first surface 31 through which at least part of the augmented reality image light reflected by the reflective units 20 and real object image light is output toward the user's pupil, and the second surface 32 which is opposite to the first surface 31 and onto which real object image light is incident. The reflective units 20 are disposed inside between the first surface 31 and the second surface 32.

The optical means 10 may include a lens made of glass or plastic material or other synthetic resin materials.

Meanwhile, at least one of the first and second surfaces 31 and 32 of the optical means 10 may be formed as a curved surface. In other words, any one of the first surface 31 and the second surface 32 may be a curved surface, and both the first surface 31 and the second surface 32 may be formed as curved surfaces.

In this case, the curved surface may be a concave surface or a convex surface. The concave surface means that when the corresponding surface is viewed from the front, the central part is formed to be thinner than the edge part and be thus concave. The convex surface means that when the corresponding surface is viewed from the front, the central part is formed to be thicker than the edge part and thus protrude convexly.

When the first surface 31 is formed as a concave surface, the second surface 32 may be formed as any one of a flat surface, a concave surface, and a convex surface.

The embodiment shown in FIG. 4(a) shows a case where the first surface 31 is formed as a concave surface and the second surface 32 is formed as a flat surface, and is intended for the vision correction of a nearsighted user.

According to the optical apparatus 100 for augmented reality shown in FIG. 4(b), when a user is nearsighted, the augmented reality image light indicated by the dotted lines is output from the display device 11, is incident onto the second surface 32 of the optical means 30 through the collimator 12, is reflected by total internal reflection on the second surface 32 of the optical means 30, is incident onto the reflective units 20, and is then transferred to the pupil 40 by being reflected by the reflective units 20. In this case, since the first surface 31 is formed as a flat surface, the augmented reality image light passes through the first surface 31 without any change, and thus an image is formed in front of the retina.

Furthermore, since both the first surface 31 and the second surface 32 are formed as flat surfaces, the real object image light indicated by the solid lines also forms an image in front of the retina, as shown in FIG. 4(b).

Meanwhile, according to the optical apparatus 200 for augmented reality according to the embodiment of FIG. 4(a), the augmented reality image light indicated by the dotted lines is output from the display device 11, is incident onto the second surface 32 of the optical means 30 through the collimator 12, is incident onto the reflective units 20 by being reflected by total internal reflection on the second surface 32 of the optical means 30, and is then transferred to the pupil 40 by being reflected by the reflective units 20. In this case, since the first surface 31 is formed as a concave surface, the augmented reality image light diverges outward while passing through the first surface 31 and the focal length is increased while the augmented reality image light passes through the pupil 40. Thus, the augmented reality image light is transferred to the retina with the augmented reality image being in focus on the retina.

Furthermore, according to the optical apparatus 200 for augmented reality according to the embodiment of FIG. 4(a), the real object image light indicated by the solid lines also diverges outward while passing through the first surface 31, so that it can be seen that the focal length is increased while the real object image light passes through the pupil 40. Thus, the real object image light is also transferred to the retina with the real object image being in focus on the retina.

As a result, the optical apparatus 200 for augmented reality according to the embodiment of FIG. 4(a) may provide a vision correction function for both the augmented reality image light and the real object image light to a nearsighted user.

Meanwhile, the first surface 31 of the optical means 30 may be formed as a convex surface. Even in this case, the second surface 32 may be formed as any one of a flat surface, a concave surface, and a convex surface.

Figure 5:
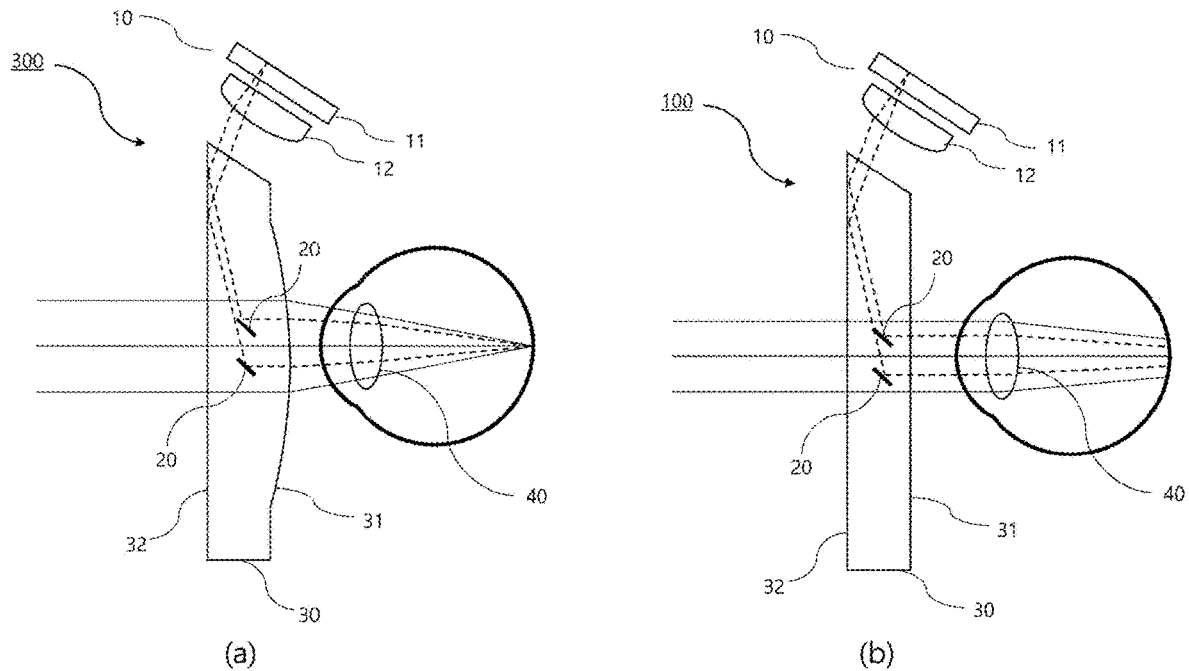
FIG. 5 is a diagram showing the overall configuration of an optical apparatus (300) for augmented reality with a vision correction function according to another embodiment of the present invention.

FIG. 5 is a diagram showing the overall configuration of an optical apparatus 300 for augmented reality with a vision correction function according to another embodiment of the present invention.

FIG. 5(a) shows a side view of the optical apparatus 300 for augmented reality with a vision correction function according to the other embodiment of the present invention, and FIG. 5(b) shows a side view of the conventional optical apparatus 100 for augmented reality described in the prior art document for the purpose of comparison with the present embodiment.

The embodiment shown in FIG. 5(a) is characterized in that the first surface 31 of an optical means 30 is formed as a convex surface and the second surface 32 thereof is formed as a flat surface, and is intended for the vision correction of a farsighted user.

In other words, according to the optical apparatus 100 for augmented reality of FIG. 5(b), when a user is farsighted, both the augmented reality image light indicated by the dotted lines and the real object image light indicated by the solid lines form images behind the retina.

Meanwhile, according to the optical apparatus 300 for augmented reality of the embodiment of FIG. 5(a), the augmented reality image light indicated by the dotted lines is output from a display device 11, is incident onto the second surface 32 of the optical means 30 through a collimator 12, is incident onto reflective units 20 by being reflected by total internal reflection on the second surface 32 of the optical means 30, and is then transferred to the pupil 40 by being reflected by the reflective units 20. In this case, the first surface 31 is formed as a convex surface, so that the augmented reality image light converges inward while passing through the first surface 31. Thus, it can be seen that the focal length is decreased while the augmented reality image light passes through the pupil 40, so that the augmented reality image light is transferred to the retina with the augmented reality image being in focus on the retina.

Furthermore, according to the optical apparatus 300 for augmented reality of the embodiment of FIG. 5(a), the real object image light indicated by the solid lines also converges inward while passing through the first surface 31, so that it can be seen that the focal length is decreased while the real object image light passes through the pupil 40. Thus, the real object image light is transferred to the retina with the real object image being in focus on the retina.

Therefore, the embodiment of FIG. 5(a) may provide a vision correction function for both the augmented reality image light and the real object image light to a farsighted user.

Figure 6:
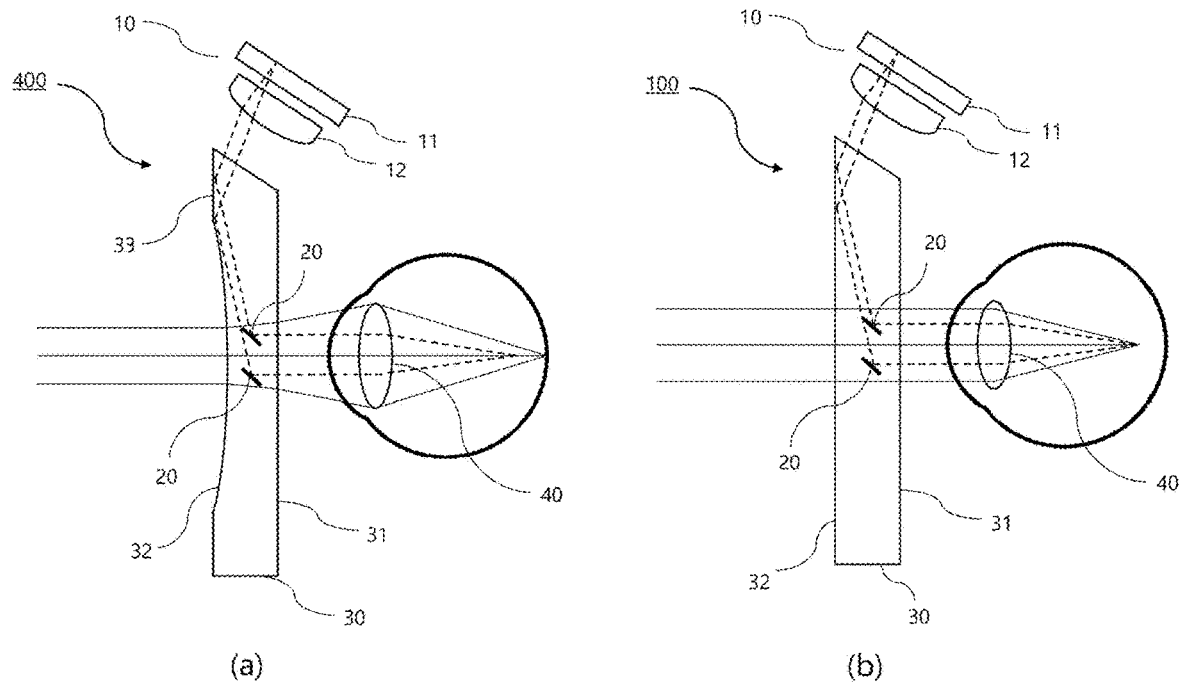
FIG. 6 is a diagram showing the overall configuration of an optical apparatus (400) for augmented reality with a vision correction function according to still another embodiment of the present invention.

FIG. 6 is a diagram showing the overall configuration of an optical apparatus 400 for augmented reality with a vision correction function according to still another embodiment of the present invention.

FIG. 6(a) shows a side view of the optical apparatus 400 for augmented reality with a vision correction function according to the present embodiment of the present invention, and FIG. 6(b) shows a side view of the conventional optical apparatus 100 for augmented reality described in the prior art document for the purpose of comparison with the present embodiment.

The embodiment shown in FIG. 6(a) is characterized in that the second surface 32 of an optical means 30 is formed as a concave surface and the first surface 31 thereof is formed as a flat surface, and is intended for the vision correction of a nearsighted user for real object image light.

In other words, according to the optical apparatus 100 for augmented reality of FIG. 6(b), when a user is nearsighted, both the first surface 31 and the second surface 32 are formed as flat surfaces as described above, so that both the augmented reality image light indicated by the dotted lines and the real object image light indicated by the solid lines form images in front of the retina.

Meanwhile, according to the optical apparatus 400 for augmented reality of the embodiment of FIG. 6(a), the real object image light indicated by the solid lines diverges outward while passing through the second surface 32, and then the focal length is increased while the real object image light passes through the first surface 31 and the pupil 40. Thus, it can be seen that the real object image light is transferred to the retina so that the real object image is formed on the retina being in focus.

However, in the case of the optical apparatus 400 for augmented reality according to the embodiment of FIG. 6(a), the first surface 31 is formed as a flat surface, so that a vision correction function for augmented reality image light may not be provided.

Therefore, the embodiment of FIG. 6(a) may provide a vision correction function, limited only to real object image light, for a nearsighted user.

Meanwhile, in the embodiment of FIG. 6(a), the augmented reality image light output from an image output unit 10 is reflected by total internal reflection on the second surface 32 of the optical means 30 once, and is then incident onto reflective units 20. In this case, the second surface 32 of the optical means 30 needs to have a total internal reflection area 33 formed as a flat surface configured to reflect the augmented reality image light, output from the image output unit 10, by total internal reflection.

When the augmented reality image light output from the image output unit 10 is reflected by total internal reflection on the first and second surfaces 31 and 32 of the optical means 30 at least twice, both the first surface 31 and the second surface 32 on which total internal reflection is performed have total internal reflection areas 33 formed as flat surfaces.

In other words, the augmented reality image light output from the image output unit 10 may be reflected by total internal reflection on at least one of the first and second surfaces 31 and 32 of the optical means 30 at least once, and may then be transferred to the reflective units 20. In this case, it is preferable that at least one of the first and second surfaces 31 and 32 of the optical means 30 on which total internal reflection is performed has a flat total internal reflection area 33 configured to reflect the augmented reality image light, output from the image output unit 10, by total internal reflection.

Figure 7:
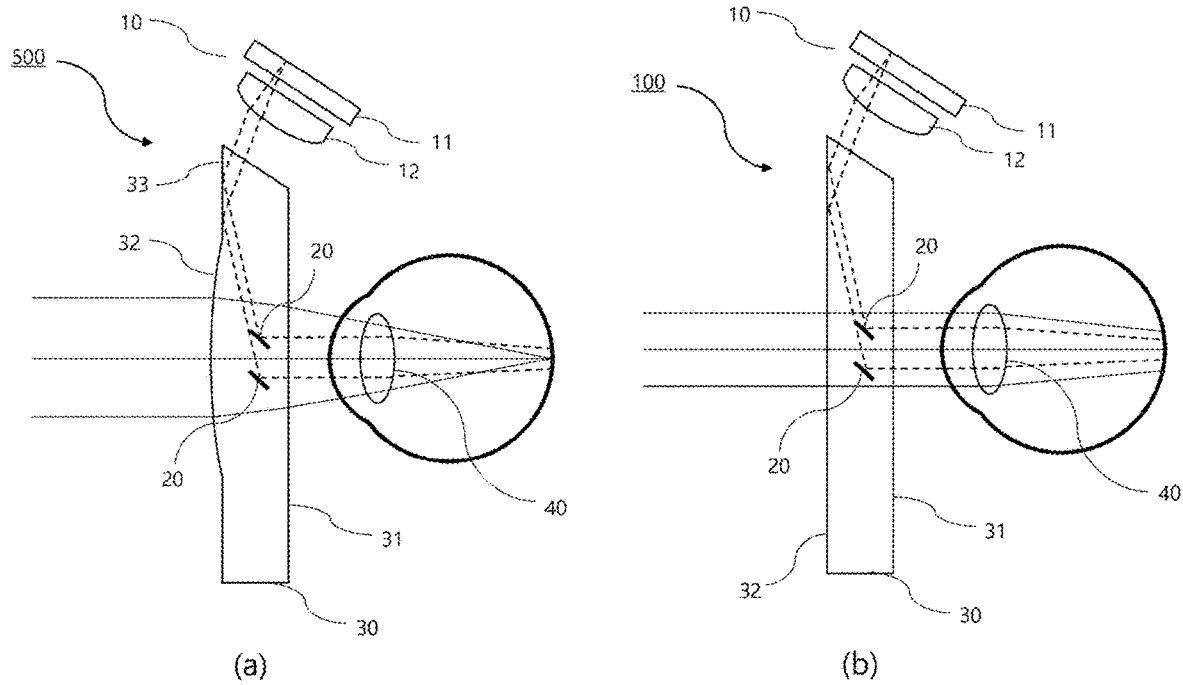
FIG. 7 is a diagram showing the overall configuration of an optical apparatus (500) for augmented reality with a vision correction function according to still another embodiment of the present invention.

FIG. 7 is a diagram showing the overall configuration of an optical apparatus 500 for augmented reality with a vision correction function according to still another embodiment of the present invention.

FIG. 7(a) shows a side view of the optical apparatus 500 for augmented reality with a vision correction function according to the present embodiment of the present invention, and FIG. 7(b) shows a side view of the conventional optical apparatus 100 for augmented reality described in the prior art document for the purpose of comparison with the present embodiment.

The embodiment shown in FIG. 7(a) shows a case where a second surface 32 is formed as a convex surface and a first surface 31 is formed as a flat surface, and is intended for the vision correction of a farsighted user for real object image light.

According to the optical apparatus 100 for augmented reality of FIG. 7(b), when a user is farsighted, both the first surface 31 and the second surface 32 are formed as flat surfaces as described above, so that both the augmented reality image light indicated by the dotted lines and the real object image light indicated by the solid lines form images behind the retina.

Meanwhile, according to the optical apparatus 500 for augmented reality of the embodiment of FIG. 7(a), the real object image light indicated by the solid lines converges inward while passing through the second surface 32 and then the focal length is decreased while the real object image light passes through the first surface 31 and the pupil 40. Thus, it can be seen that the real object image light is transferred to the retina such that the real object image being in focus is formed on the retina.

However, in the case of the optical apparatus 500 for augmented reality according to the embodiment of FIG. 7(a), the first surface 31 is formed as a flat surface, so that a vision correction function for augmented reality image light may not be provided.

Therefore, the embodiment of FIG. 7(a) may provide a vision correction function, limited only to real object image light, to a farsighted user.

When the optical apparatuses 400 and 500 for augmented reality according to the embodiments of FIGS. 6 and 7 are used alone, a vision correction function for augmented reality image light may not be provided. However, when they are used in combination with another auxiliary optical device, a vision correction function for augmented reality image light may be provided. For example, the optical apparatuses 400 and 500 may be used in combination with another auxiliary optical device in such a manner that the optical apparatuses 400 and 500 for augmented reality are each formed as a separate lens module and used in the form of being coupled to general glasses by means such as a clip, the optical apparatuses 400 and 500 for augmented reality are formed in the form of glasses and a separate lens module for vision correction for augmented reality image light is used, or the like. Accordingly, there is an advantage in that the degree of freedom in terms of design may be increased.

Figure 8:
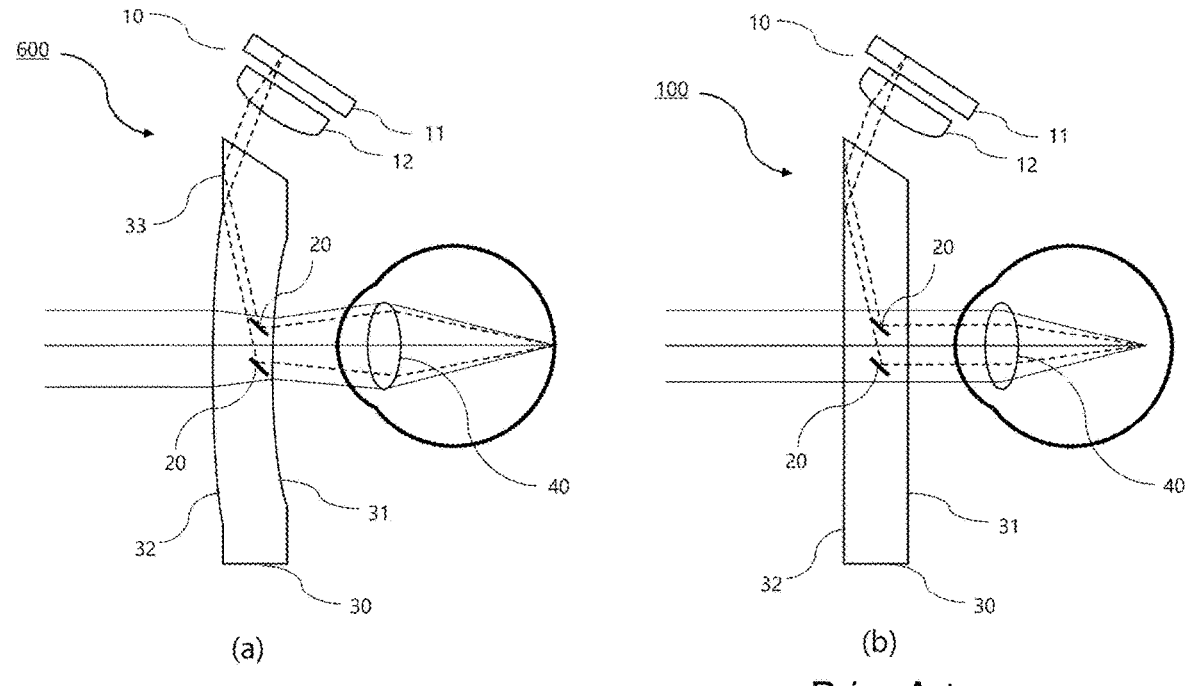
FIG. 8 is a diagram showing the overall configuration of an optical apparatus (600) for augmented reality with a vision correction function according to still another embodiment of the present invention.

FIG. 8 is a diagram showing the overall configuration of an optical apparatus 600 for augmented reality with a vision correction function according to still another embodiment of the present invention.

FIG. 8(*a*) shows a side view of the optical apparatus 600 for augmented reality with a vision correction function according to the present embodiment of the present invention, and FIG. 8(*b*) shows a side view of the conventional optical apparatus 100 for augmented reality described in the prior art document for the purpose of comparison with the present embodiment.

The embodiment shown in FIG. 8(*a*) shows a case where the first surface 31 of an optical means 30 is formed as a concave surface, the second surface 32 thereof is formed as a convex surface, and the curvature of the first surface 31 is made larger than the curvature of the second surface 32, so that the overall optical means 30 serves as a concave lens, and is intended for the vision correction of a nearsighted user for augmented reality image light and real object image light.

According to the optical apparatus 100 for augmented reality of FIG. 8(*b*), when a user is nearsighted, both the first surface 31 and the second surface 32 are formed as flat surfaces as described above, so that both the augmented reality image light indicated by the dotted lines and the real object image light indicated by the solid lines form images in front of the retina.

Meanwhile, according to the optical apparatus 600 for augmented reality of the embodiment of FIG. 8(*a*), the augmented reality image light indicated by the dotted lines is output from a display device 11, is incident onto the second surface 32 of an optical means 30 through a collimator 12, is incident onto reflective units 20 by being reflected by total internal reflection on the second surface 32 of the optical means 30, and is then transferred to the pupil 40 by being reflected by the reflective units 20, as previously described in FIG. 4(*a*). In this case, the first surface 31 is formed as a concave surface, so that the augmented reality image light diverges outward while passing through the first surface 31. Thus, it can be seen that the focal length is increased while the augmented reality image light passes through the pupil 40, so that the augmented reality image light is transferred to retina such that the augmented reality image is formed on the retina being in focus.

Also, according to the optical apparatus 600 for augmented reality of the embodiment of FIG. 8(*a*), the real object image light indicated by the solid lines converges slightly inward while passing through the second surface 32 formed as a convex surface, and then diverges considerably outward while passing through the first surface 31 having a larger curvature than the second surface 32, so that it can be seen that the overall focal length is increased while the real object image light passes through the pupil 40. Thus, the real object image light is transferred to the retina such that the real object image is formed on the retina being in focus.

Therefore, the embodiment of FIG. 8(*a*) may provide a vision correction function for both augmented reality image light and real object image light to a nearsighted user. In this case, the optical means 30 may be implemented as a glasses lens used in real by a nearsighted user, so that only the optical apparatus 600 for augmented reality can be used as an augmented reality provision apparatus in the form of glasses without a separate auxiliary optical means.

Figure 9:
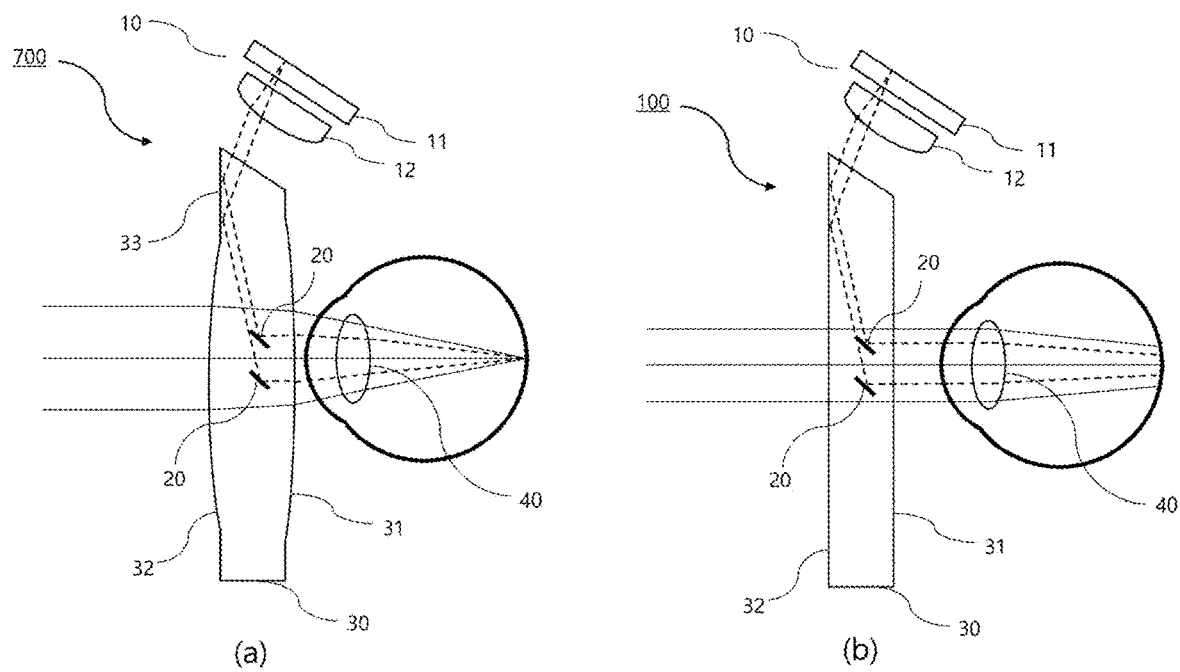
FIG. 9 is a diagram showing the overall configuration of an optical apparatus (700) for augmented reality with a vision correction function according to still another embodiment of the present invention.

FIG. 9 is a diagram showing the overall configuration of an optical apparatus 700 for augmented reality with a vision correction function according to still another embodiment of the present invention.

FIG. 9(*a*) shows a side view of the optical apparatus 700 for augmented reality with a vision correction function according to the present embodiment of the present invention, and FIG. 9(*b*) shows a side view of the conventional optical apparatus 100 for augmented reality described in the prior art document for the purpose of comparison with the present embodiment.

The embodiment shown in FIG. 9(*a*) is similar to the embodiment of FIG. 8(*a*), but a first surface 31 and a second surface 32 are formed as convex surfaces, so that an overall optical means 30 is formed to serve as a convex lens, and is intended for the vision correction of a farsighted user for augmented reality image light and real object image light. Since other components are the same as those described in FIG. 8, detailed descriptions thereof will be omitted.

Meanwhile, although not shown, when the first surface 31 of the optical means 30 is formed as a concave surface, the second surface 32 thereof is formed as a convex surface, and the curvature of the second surface 32 is made larger than the curvature of the first surface 31, the overall optical means 30 may be made to serve as a convex lens (This type of lens is usually referred to as a positive meniscus lens). In this case, a vision correction function for real object image light may be provided to a farsighted user, but a vision correction effect for augmented reality image light is insufficient. Accordingly, in this case, it is necessary to use another component such as the curved structure of a reflective unit or the thickness or spacing of a collimator for providing vision correction function for augmented reality image light to a farsighted user.

In addition to the embodiments of FIGS. 8 and 9, there may be used various combinations in which both the first surface 31 and the second surface 32 are curved. In this case, the first surface 31 and the second surface 32 may be formed as a combination of a concave surface and a convex surface, and the overall optical means 30 may be made to serve as a concave lens or a convex lens depending on whether a user is nearsighted or farsighted by appropriately adjusting the curvatures of the lenses.

Figure 10:
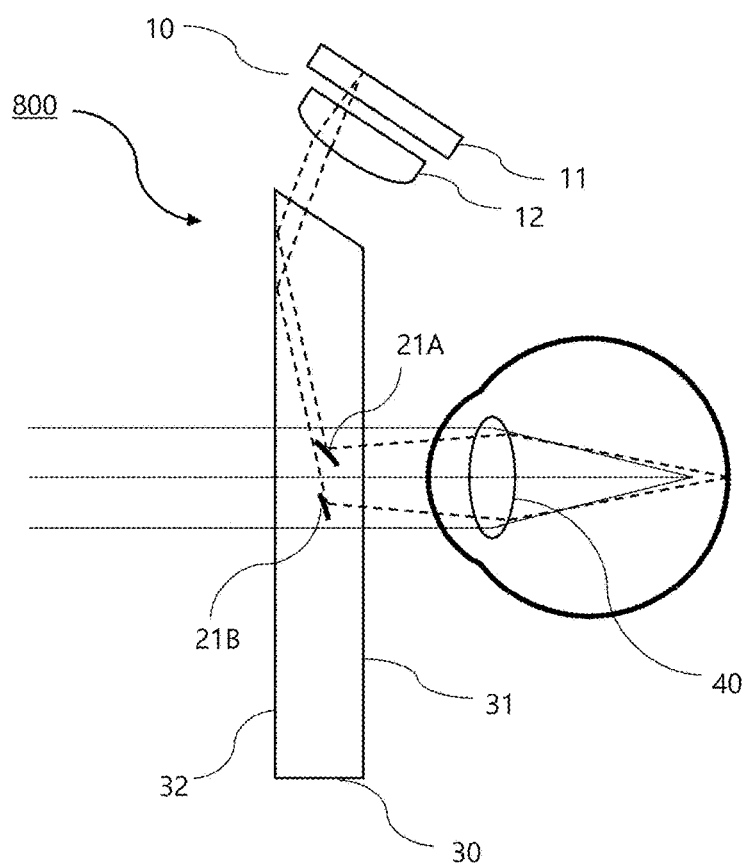
Figure 11:
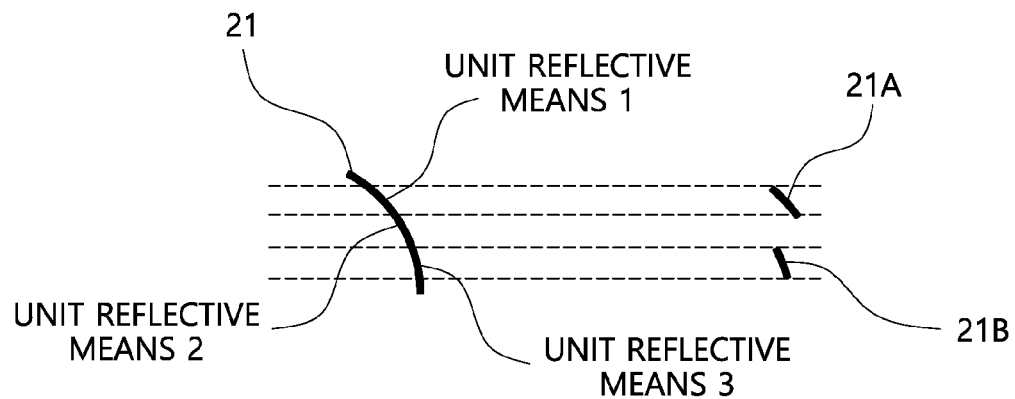

FIGS. 10 and 11 are diagrams illustrating an optical device 800 for augmented reality with a vision correction function according to still another embodiment of the present invention, wherein FIG. 10 is a side view showing the overall configuration of the optical device 800 for augmented reality and FIG. 11 is a view illustrating the configuration of reflective units 21A and 21B.

Although the embodiment of FIG. 10 has the same basic configuration as the optical apparatus 100 for augmented reality described in the prior art document with reference to FIGS. 4 to 9, it is different in that the surfaces of the reflective units 21A and 21B are formed as curved surfaces.

In this case, the reflective units 21A and 21B may be formed as two or more reflective units.

Furthermore, the surfaces of the reflective units 21A and 21B may be formed as a convex surface or a concave surface.

In the embodiment of FIG. 10, the two reflective units 21A and 21B having a surface formed as a convex surface are formed, which is intended to provide a vision correction function for augmented reality image light to a nearsighted user.

As shown in FIG. 10, the augmented reality image light indicated by the dotted lines is incident onto the reflective units 21A and 21B after being reflected by total internal reflection on the second surface 32 of the optical means 30, and is transferred to the pupil 40 by being reflected by the reflective units 21A and 21B. In this case, the reflective units 21A and 21B are formed as convex surfaces, so that the augmented reality image light is transferred to the pupil 40 while being diverged outward by the reflective units 21A and 21B formed as convex surfaces. Accordingly, the focal length is increased such that the augmented reality image light can be transferred to form an image on the retina through the pupil 40, thereby providing a vision correction function for the augmented reality image light to a nearsighted user.

Meanwhile, when the reflective units 21A and 21B are formed as a plurality of reflective units, the plurality of reflective units 21A and 21B may include at least some of a plurality of unit reflective means obtained by dividing one reflective means 21 having a surface formed as a curved surface.

FIG. 11 is a view illustrating the configuration of the reflective units 21A and 21B.

Referring to FIG. 11, when one reflective means 21 having a surface formed as a curved surface is divided along four dotted lines as shown in the drawings, three unit reflective means may be obtained.

The two reflective units 21A and 21B may be formed by using two unit reflective means, i.e., the unit reflective means 1 and the unit reflective means 3, excluding the unit reflective means 2, among the three unit reflective units.

Although FIG. 11 shows a case where three unit reflective means are obtained by dividing one reflective means 21, this is exemplary. It is obvious that in some cases, four, five, or more unit reflective means may be formed through division and reflective units may be configured using some of them.

The reflective units 21A and 21B may be formed by the steps of:

i) placing one reflective means 21 in a forward direction from the pupil, ii) dividing the one reflective means 21 into the plurality of unit reflective means, and iii) disposing the unit reflective means to be used as the reflective units 21A, 21B between first and second surfaces 31, 32 of the optical means 30 by moving the unit reflective means to be used as the reflective units 21A, 21B without a change to their shapes in directions parallel to the forward direction from the pupil 40.

In this case, the reflective units 21A and 21B may be disposed alongside each other to be horizontal to the first and second surfaces 31 and 32 of the optical means 30, this is not necessarily the case. As described above, each of the reflective units 21A and 21B may be disposed at an appropriate angle in order not to block augmented reality image light from being transferred to the other reflective unit.

Figure 12:
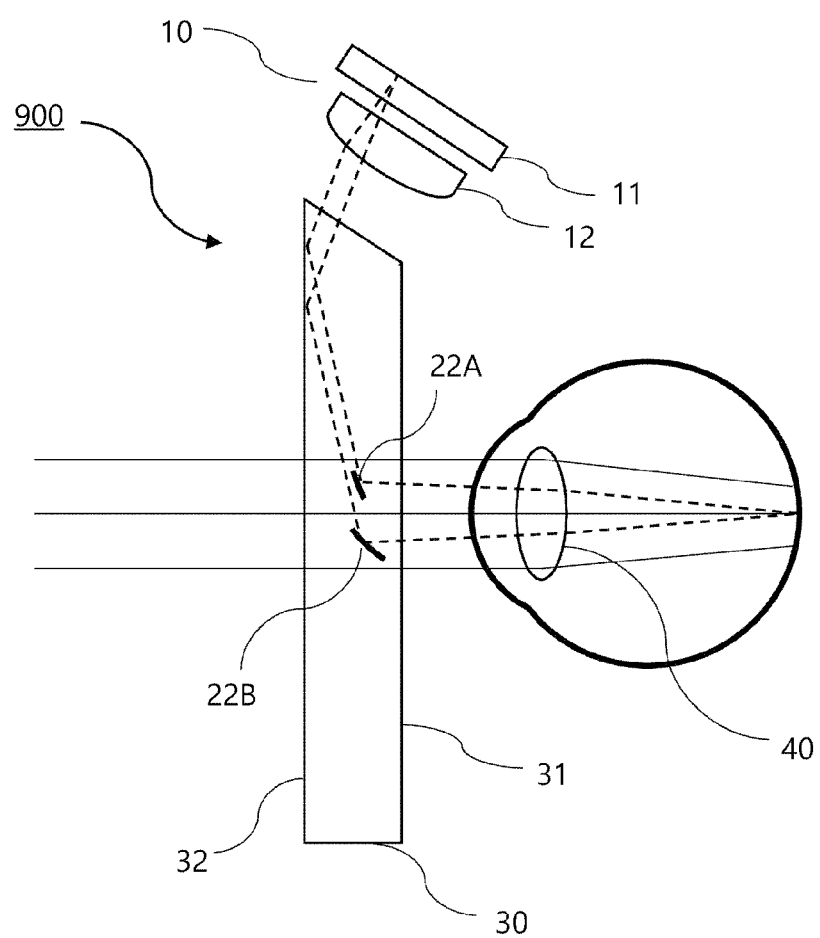
Figure 13:
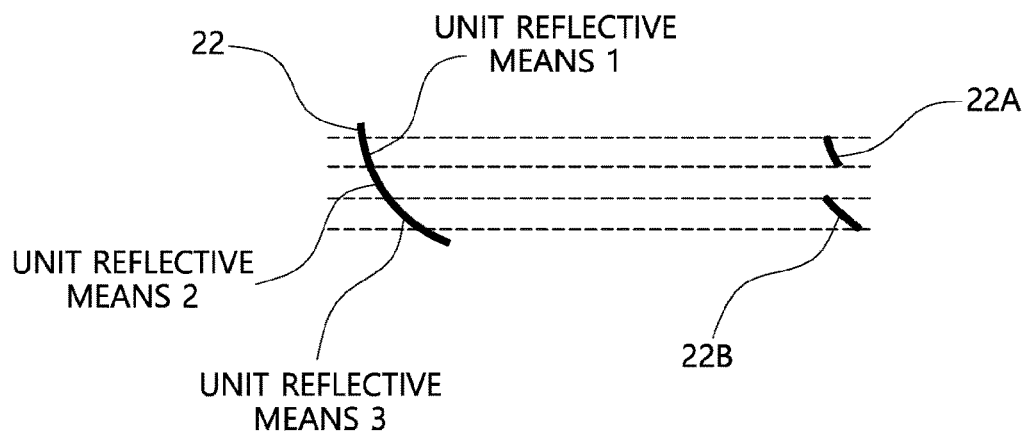

FIGS. 12 and 13 are diagrams illustrating an optical device 900 for augmented reality with a vision correction function according to still another embodiment of the present invention, wherein FIG. 12 is a side view showing the overall configuration of the optical device 900 for augmented reality and FIG. 13 is a view illustrating the configuration of reflective units 22A and 22B.

Although the embodiments of FIGS. 12 and 13 have the same basic configuration as the embodiments described with reference to FIGS. 10 and 11, they are different in that the surfaces of the reflective units 22A and 22B are formed as concave surfaces.

In the embodiment of FIG. 12, two reflective units 22A and 22B having a surface formed as a concave surface are formed, which is intended to provide a vision correction function for augmented reality image light to a farsighted user.

As shown in FIG. 12, the augmented reality image light indicated by the dotted lines is incident onto the reflective units 22A and 22B after being reflected by total internal reflection on the second surface 32 of the optical means 30, and is transferred to the pupil 40 by being reflected by the reflective units 22A and 22B. In this case, the reflective units 22A and 22B are formed as concave surfaces, so that augmented reality image light is transferred to the pupil 40 while being converged inward by the reflective units 22A and 22B, which are concave surfaces. Accordingly, the focal length is decreased, so that the augmented reality image light can be transferred such that the augmented reality image light forms an image on the retina through the pupil 40, thereby providing a vision correction function for augmented reality image light to a farsighted user.

Even in this case, when the reflective units 22A and 22B are formed as a plurality of reflective units, the plurality of reflective units 22A and 22B may include at least some of a plurality of unit reflective means obtained by dividing one reflective means 21 having a surface formed as a curved surface.

FIG. 13 is a view illustrating the configuration of the reflective units 22A and 22B.

The configuration of the reflective units 22A and 22B of FIG. 13 is the same as that described with reference to FIG. 11, except that the reflective units 22A and 22B are formed as concave surfaces.

In other words, as shown in FIG. 13, when one reflective means 22 having a surface formed as a curved surface is divided into four dotted lines, three unit reflective means may be obtained. The two reflective units 22A and 22B may be formed by using two unit reflective means, i.e., the unit reflective means 1 and the unit reflective means 3, excluding the unit reflective means 2, among the three unit reflective means.

As described in FIG. 11, the reflective units 22A and 22B may be formed by the steps of: placing the one reflective means 221 in a forward direction from the pupil 40, dividing one reflective means 22 into a plurality of unit reflective means and then disposing unit reflective means, to be used as the reflective units 22A and 22B, between the first and second surfaces 31 and 32 of the optical means 30 by moving the unit reflective means to be used as the reflective units 22A and 22B without a change to their shapes in directions parallel to the forward direction from the pupil 40.

In this case, the reflective units 22A and 22B disposed between the first and second surfaces 31 and 32 of the optical means 30 may be disposed alongside each other to be horizontal to the first and second surfaces 31 and 32 of the optical means 30. Alternatively, each of the reflective units 22A and 22B may be disposed at an appropriate angle in order not to block augmented reality image light from being transferred to the other reflective unit.

Figure 14:
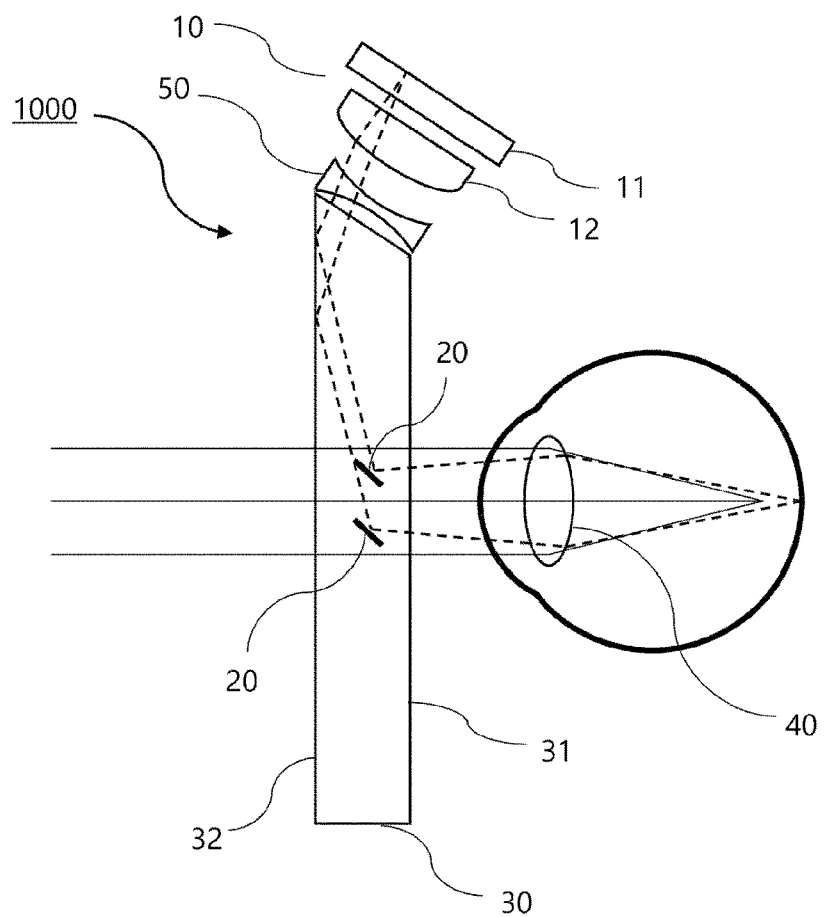
FIGS. 14 and 15 are diagrams showing optical apparatuses (1000 and 1100) for augmented reality according to other embodiments of the present invention.
Figure 15:
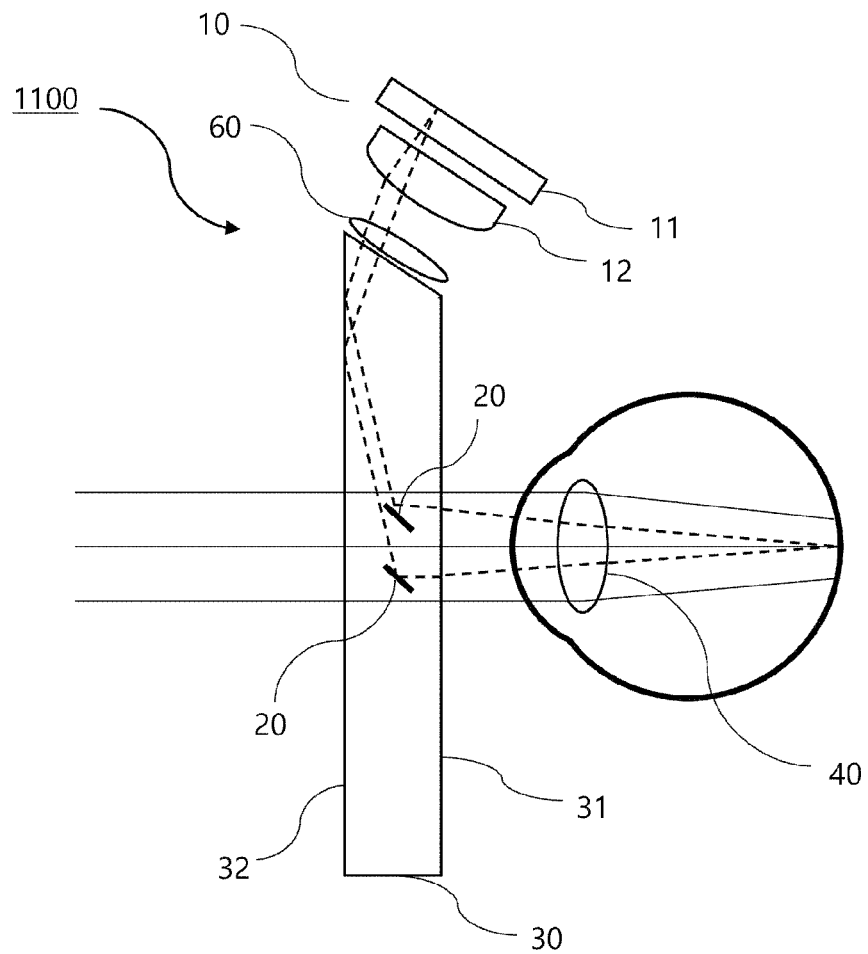

FIGS. 14 and 15 are diagrams showing optical apparatuses 1000 and 1100 for augmented reality according to other embodiments of the present invention.

The optical apparatuses 1000 and 1100 for augmented reality of the embodiments of FIGS. 14 and 15 have the same basic configuration as the optical apparatus 100 for augmented reality of the prior art document described with reference to FIGS. 4 to 9, and are characterized in that they provide a vision correction function by using an auxiliary optical element 50 or 60.

In other words, the optical apparatuses 1000 and 1100 for augmented reality are characterized in that the auxiliary optical element 50 or 60 is disposed between an image output unit 10 and an optical means 30, and thereby the augmented reality image light output from the image output unit 10 is refracted and then transferred to the optical means 30.

In this case, the auxiliary optical elements 50 and 60 may each be a refractive means such as a concave lens or a convex lens.

The embodiment of FIG. 14 shows a case where a concave lens 50 is used as an auxiliary optical element, and the embodiment of FIG. 15 shows a case where a convex lens 60 is used as an auxiliary optical element.

As shown in FIG. 14, when the concave lens 50 is used, the auxiliary optical element 50 refracts augmented reality image light so that the augmented reality image light diverges outward. Accordingly, when the augmented reality image light is transferred to the retina through the pupil 40 via reflective units 20, the focal length is increased, thereby providing a vision correction function for a nearsighted user.

As shown in FIG. 15, when the convex lens 60 is used, the auxiliary optical element 60 refracts augmented reality image light so that the augmented reality image light converges inward. Accordingly, when the augmented reality image light is transferred to the retina through the pupil 40 via the reflective units 20, the focal length may be decreased, thereby providing a vision correction function for a farsighted user.

Meanwhile, in addition to the refractive means such as a concave lens or a convex lens, an optical element such as a diffraction means or a hologram element may be used as each of the auxiliary optical elements 50 and 60.

Meanwhile, a vision correction function for augmented reality image light may be obtained by adjusting the distance between a display device 11 and a collimator 12 or using the collimator 12 having a different focal length.

Figure 16:
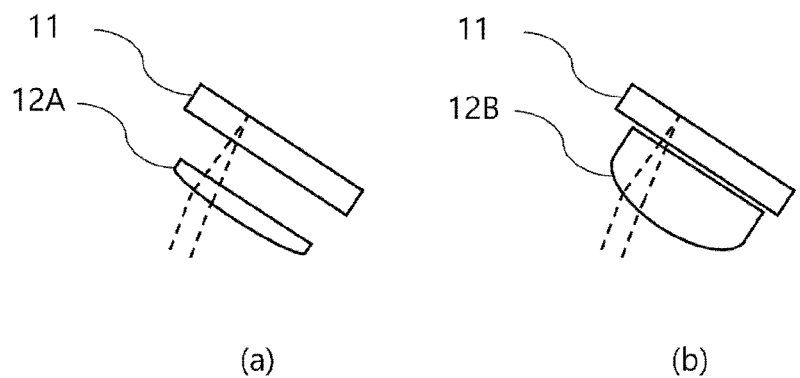
FIG. 16 is a view illustrating a vision correction function using a collimator (12A or 12B)

FIG. 16 is a view illustrating a vision correction function using a collimator 12A or 12B.

As shown in FIGS. 16(a) and 16(b), there is illustrated a principle in which when the focal length is varied by forming the collimator 12A to be thin or thick, augmented reality image light may be refracted such that it can diverge or converge, thereby providing a vision correction function for the augmented reality image light for a nearsighted or farsighted user.

Furthermore, as shown in the drawing, the optical path along which augmented reality image light is transferred to the optical means 30 is changed by varying the interval between the display device 11 and the collimator 12A or 12B, thereby providing a vision correction function.

The method of varying the focal length of the collimator 12A or 12B and the method of varying the interval between the display device 11 and the collimator 12A or 12B may be used in combination with each other.

Furthermore, the configuration described with reference to FIG. 16 may be used in combination with the embodiment described with reference to FIG. 14 or 15.

Meanwhile, the embodiments described with reference to FIGS. 4 to 16 may be used in combination with each other.

Figure 17:
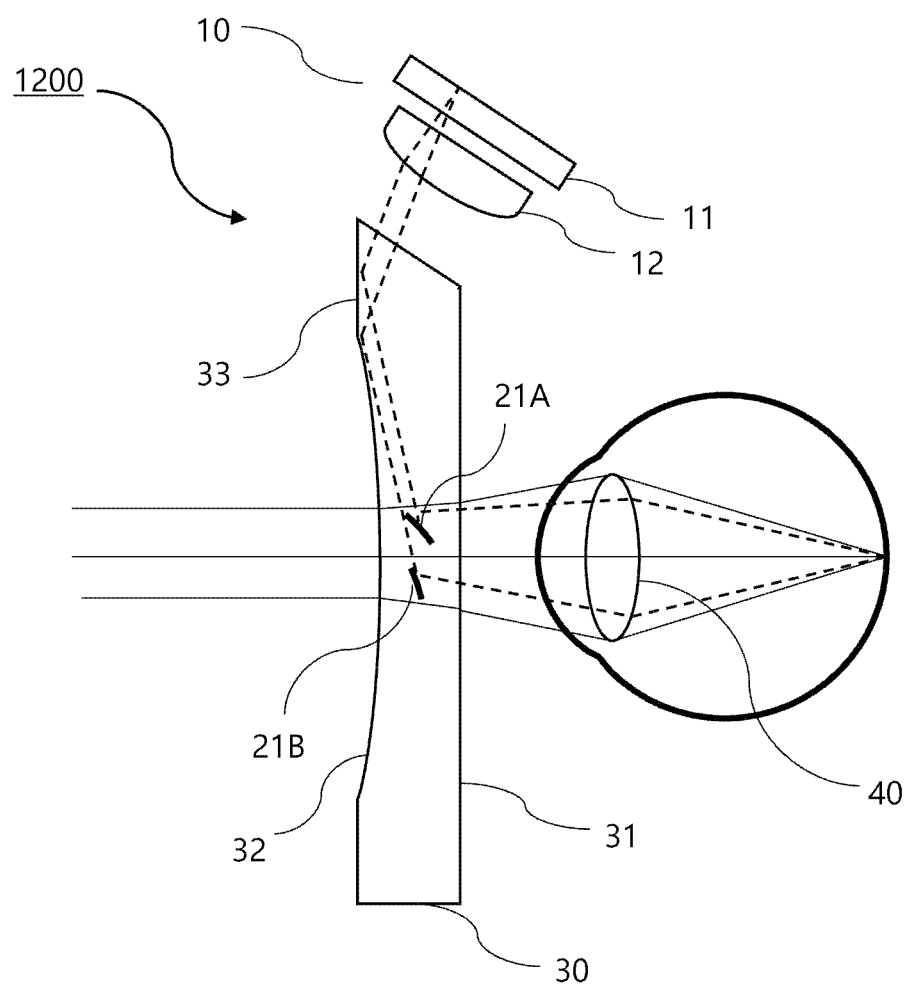
FIGS. 17 and 18 show optical apparatuses (1200 and 1300) for augmented reality according to other embodiments of the present invention, and show cases in which the embodiments of FIGS. 4 to 16 are used in combination as examples.
Figure 18:
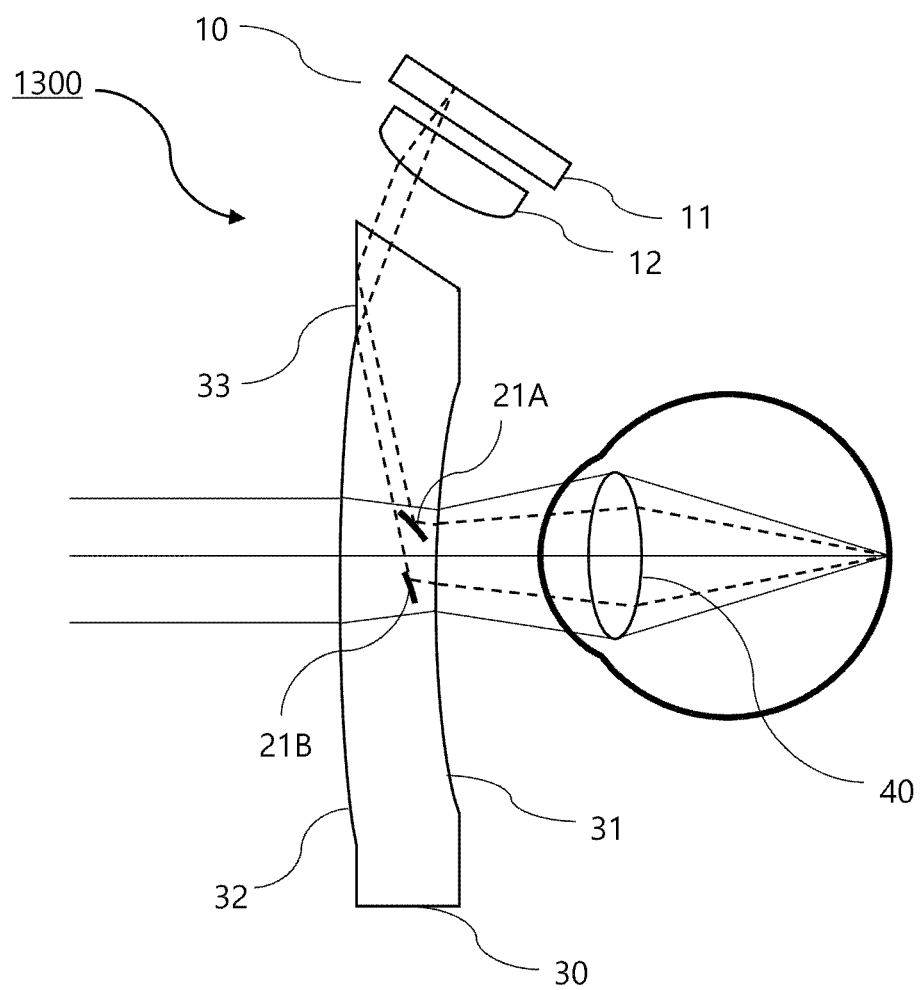

FIGS. 17 and 18 show optical apparatuses 1200 and 1300 for augmented reality according to other embodiments of the present invention, and show cases in which the embodiments of FIGS. 4 to 16 are used in combination as examples.

The embodiment of FIG. 17 shows the optical apparatus 1200 for augmented reality to which the embodiment of FIG. 6 and the embodiment of FIG. 10 are applied in combination.

In other words, in the optical apparatus 1200 for augmented reality of the embodiment of FIG. 17, a second surface 32 is formed as a concave surface as in the embodiment of FIG. 6, thereby providing a nearsightedness correction function for real object image light, and reflective units 21A and 21B having a convex surface are disposed as in the embodiment of FIG. 10, thereby providing a nearsightedness correction function for augmented reality image light.

Meanwhile, the embodiment of FIG. 18 shows the optical apparatus 1300 for augmented reality to which the embodiment of FIG. 8 and the embodiment of FIG. 10 are applied in combination.

In other words, in the embodiment of FIG. 18, as in the embodiment of FIG. 8, the first surface 31 of an optical means 30 is formed as a concave surface, the second surface 32 thereof is formed as a convex surface, and the curvature of the first surface 31 is made larger than the curvature of the second surface 32, so that the overall optical means 30 may serve as a concave lens, thereby providing a vision correction function for augmented reality image light and real object image light to a nearsighted user. Furthermore, as in the embodiment of FIG. 10, the reflective units 21A and 21B having a convex surface are disposed, thereby additionally providing a vision correction function for augmented reality image light to a nearsighted user.

The embodiments of FIGS. 17 and 18 are exemplary. In addition to these embodiments, the embodiments of FIGS. 4 to 16 may be combined in various manners, thereby providing a composite vision correction function according to usage examples.

While the present invention has been described with reference to the preferred embodiments according to the present invention, it should be noted that the present invention is not limited to the above embodiments and various modifications and variations may be made within the scope of the present invention.

The invention claimed is:

1. An optical apparatus for augmented reality with a vision correction function, the optical apparatus comprising:
   an image output unit configured to output augmented reality image light, which is image light corresponding to an image for augmented reality;
   a reflective unit configured to transfer the augmented reality image light, output from the image output unit, to a pupil of a user's eye by reflecting the augmented reality image light toward the pupil, thereby providing an image for augmented reality to the user; and
   an optical means configured such that the reflective unit is disposed therein, and configured to transmit therethrough at least part of real object image light, which is image light output from a real object, toward the pupil of the user's eye;
   wherein the optical means includes a first surface through which at least part of the augmented reality image light reflected by the reflective unit and the real object image light is output toward the user's pupil, and a second surface which is opposite to the first surface and onto which the real object image light is incident;

wherein the reflective unit is disposed inside between the first and second surfaces of the optical means;

wherein at least any one of the first and second surfaces of the optical means has a total internal reflection area formed as a flat surface configured to reflect the augmented reality image light, output from the image output unit, by total internal reflection and has a curved area formed as a curved surface; and wherein the augmented reality image light output from the image output unit is transferred to the reflective unit after being reflected by total internal reflection once on the total internal reflection area formed as a flat surface provided at the at least one of the first and second surfaces of the optical means.

2. The optical apparatus of claim 1, wherein the curved surface is a concave surface or a convex surface.

3. The optical apparatus of claim 2, wherein a surface other than the surface formed as the curved surface is formed as any one of a flat surface, a concave surface, and a convex surface.

4. The optical apparatus of claim 1, wherein the first surface is formed as a concave surface, the second surface is formed as a convex surface, and a curvature of the first surface is larger than that of the second surface.

5. The optical apparatus of claim 1, wherein the first surface is formed as a concave surface, the second surface is formed as a convex surface, and a curvature of the second surface is larger than that of the first surface.

6. The optical apparatus of claim 1, wherein the reflective unit is formed as a curved surface.

7. The optical apparatus of claim 1, wherein the augmented reality image light output from the image output unit is transferred to the reflective unit via an auxiliary optical element.

8. An optical apparatus for augmented reality with a vision correction function, the optical apparatus comprising:
an image output unit configured to output augmented reality image light, which is image light corresponding to an image for augmented reality;
a reflective unit configured to transfer the augmented reality image light, output from the image output unit, to a pupil of a user's eye by reflecting the augmented reality image light toward the pupil, thereby providing an image for augmented reality to the user; and
an optical means configured such that the reflective unit is disposed therein, and configured to transmit therethrough at least part of real object image light, which is image light output from a real object, toward the pupil of the user's eye;
wherein a surface of the reflective unit is formed as a curved surface;
wherein the optical means includes a first surface through which at least part of the augmented reality image light reflected by the reflective unit and the real object image light is output toward the user's pupil, and a second surface which is opposite to the first surface and onto which the real object image light is incident;
wherein the reflective unit is disposed inside between the first and second surfaces of the optical means;
wherein at least any one of the first and second surfaces of the optical means has a total internal reflection area formed as a flat surface configured to reflect the augmented reality image light, output from the image output unit, by total internal reflection and has a curved area formed as a curved surface; and
wherein the augmented reality image light output from the image output unit is transferred to the reflective unit after being reflected by total internal reflection once on the total internal reflection area formed as a flat surface provided at the at least one of the first and second surfaces of the optical means.

9. The optical apparatus of claim 8, wherein the surface of the reflective unit is a concave surface or a convex surface.

10. The optical apparatus of claim 8, wherein:
the reflective unit is formed as a plurality of reflective units; and
the plurality of reflective units includes at least some of a plurality of unit reflective means obtained by dividing one reflective means having a surface formed as a curved surface.

11. The optical apparatus of claim 10, wherein the plurality of reflective units is formed by placing the one reflective means in a forward direction from the pupil, dividing the one reflective means into the plurality of unit reflective means, and then disposing the unit reflective means to be used as the reflective units between first and second surfaces of the optical means by moving the unit reflective means to be used as the reflective units without a change to their shapes in directions parallel to the forward direction from the pupil.

12. The optical apparatus of claim 8, wherein the augmented reality image light output from the image output unit is transferred to the reflective unit via an auxiliary optical element.

13. An optical apparatus for augmented reality with a vision correction function, the optical apparatus comprising:
an image output unit configured to output augmented reality image light, which is image light corresponding to an image for augmented reality;
a reflective unit configured to transfer the augmented reality image light, output from the image output unit, to a pupil of a user's eye by reflecting the augmented reality image light toward the pupil, thereby providing an image for augmented reality to the user; and
an optical means configured such that the reflective unit is disposed therein, and configured to transmit therethrough at least part of real object image light, which is image light output from a real object, toward the pupil of the user's eye;
wherein the augmented reality image light output from the image output unit is transferred to the reflective unit via an auxiliary optical element;
wherein the optical means includes a first surface through which at least part of the augmented reality image light reflected by the reflective unit and the real object image light is output toward the user's pupil, and a second surface which is opposite to the first surface and onto which the real object image light is incident;
wherein the reflective unit is disposed inside between the first and second surfaces of the optical means;
wherein at least any one of the first and second surfaces of the optical means has a total internal reflection area formed as a flat surface configured to reflect the augmented reality image light, output from the image output unit, by total internal reflection and has a curved area formed as a curved surface; and
wherein the augmented reality image light output from the image output unit is transferred to the reflective unit after being reflected by total internal reflection once on the total internal reflection area formed as a flat surface provided at the at least one of the first and second surfaces of the optical means.

14. The optical apparatus of claim 13, wherein the auxiliary optical element is at least one of a refractive means, a diffractive means, and a holographic element.

15. The optical apparatus of claim 14, wherein the refractive means is a concave lens or a convex lens.

16. The optical apparatus of claim 13, wherein:
the image output unit includes a display device configured to output augmented reality image light by displaying an image for augmented reality on a screen, and a collimator configured to output collimated augmented reality image light output from the display device; and
an optical path along which the augmented reality image light is transferred to the optical means is changed by varying a focal length of the collimator or varying an interval between the display device and the collimator.

17. The optical apparatus of claim 13, wherein the reflective unit is formed as a curved surface.

* * * * *